Patented Apr. 20, 1943

2,316,809

UNITED STATES PATENT OFFICE 2,316,809

2-HYDROXY-ALKYLAMINO-5-SULPHO-BENZOIC ACID

Pierre Petitcolas and Joseph Frenkiel, Rouen, France; vested in the Alien Property Custodian No Drawing. Application May 21, 1940, Serial No. 336,416. In France June 12, 1939

4 Claims. (Cl. 260—507)

This invention relates to intermediary products for the production of dyestuffs, and to a process for making the same.

It has been found according to the present invention that it was possible to obtain precious intermediary materials for the production of diazo-aminated derivatives by condensing a salt of 2-chloro-5-sulphobenzoic acid with a primary hydroxy-alkylamine.

The primary hydroxy-alkylamines which can be used for the application of the said process are, for example, monoethanolamine, or monopropanolamine. The condensation of these amines with salts of 2-chloro-5-sulphobenzoic acid, such as the alkali metal salts, for example, can be effected in an open vessel or under pressure, preferably in an aqueous or aquo-alcoholic solution and in presence of an acid absorbing agent which can be an excess of the amine which is used, eventually in presence of a catalyst such as copper powder.

Thus are obtained the 2-hydroxy-alkylamino-5-sulpho-benzoic acids of the general formula:

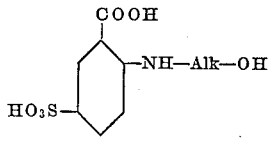

or their salts. These compounds have never been described hitherto and are consequently novel commercial products. Moreover, they are valuable intermediate products in the manufacture of dyestuffs; in fact, they can be condensed in a non-acid medium with diazo derivatives, to give novel diazo-aminated compounds of the general formula:

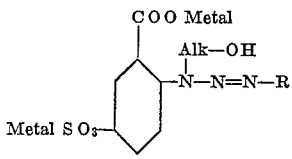

where R represents the residue of a primary aromatic amine or of an amine behaving as a primary aromatic amine in the diazotization, and alk represents an alkyl radicle; in most cases these diazoaminated compounds can be salted out in the medium in which they are produced and possess the property of splitting even in the absence of heat in presence of diluted organic acids thus regenerating the diazoic compound.

These properties make the diazoaminated compounds obtained particularly valuable for the formation on fibres of azo dyestuffs which are insoluble and very suitable for different printing and developing processes when mixed with the coupling components; namely, printing in an alkaline medium and development through acid steaming, running through an acid bath or acid fulling and drying on the drum, printing in presence of organic bases such as oxyethyl-diethylamine and development through neutral steaming.

For example, diazo-aminated derivatives of 2-5-dichloroaniline (which can be salted out and decomposed in the absence of heat with diluted organic acids) can be produced with excellent yields. This production is of a high technical interest. Indeed, dichloroaniline is a part of the composition of numerous mixtures for the printing industry and more particularly of mixtures with the arylides of betahydroxynaphthoic acid, substantive acetoacetylated derivatives and the like. Now, in practice diazoaminated compounds of dichloroaniline with anthranilic-4-sulphonic acid and with N-ethyl-anthranilic-5-sulphonic acid have been used heretofore. The first of these compounds is practically not attacked in the cold by diluted organic acids; on heating its splitting up into diazoic and stabilizer is incomplete. The second compound offers the advantage of splitting in the cold with diluted organic acids but, again, the separation through salting out is nearly impossible, its solubility being enormous even in a saline medium; one must resort to evaporation to dryness and to alcoholic extraction. These various inconveniences are avoided by the use of diazo-aminated compounds of dichloroaniline.

The following is a non-limitative example:

104 g. of the monosodic salt of 2-chloro-5-sulphobenzoic acid are dissolved in a diluted solution of soda made with 200 cc. of water and 40 cc. of a solution of soda of 35° Bé. The neutrality of the solution is checked on phenolphthalein. 26 g. of monoethanolamine, 43 g. of calcinated carbonate of sodium and 1 g. of copper powder are added.

The mixture is heated to ebullition during three hours with reflux. The reaction is terminated when the solution shows only a weak alkalinity on phenolphthalein paper. The solution, coloured a blue green by the copper salts, is treated with a solution of sodium sulphide to precipitate the copper. It is then filtered; the filtrate is evaporated to half its volume and then acidified with concentrated hydrochloric acid to a slight acidity toward Congo red. On cooling, the monosodic salt of the 2-hydroxy-ethylamino-5-sulphobenzoic acid precipitates. The crystalline magma is dehydrated, hydraulically pressed out and dried. The yield is as high as about 75%.

For the analysis the product has been re-crystallized from alcohol. It appears in the form of fine bright needles corresponding to the formula:

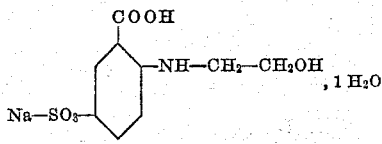

*Analysis*

|  | Calculated for $C_9H_{10}O_6NSNa$, $1H_2O$ | Found |
| --- | --- | --- |
| C percent | 35.8 | 35.74 |
| H percent | 3.98 | 4.2 |
| N percent | 4.65 | 4.74 |
| S percent | 10.63 | 10.67 |

What we claim is:

1. A process for the production of 2-hydroxy-alkylamino-5-sulphobenzoic acid, which consists in condensing a salt of 2-chloro-5-sulphobenzoic acid with a primary hydroxy-alkylamine in the presence of an acid absorbing agent.

2. A process for the production of 2-hydroxy-alkylamino-5-sulphobenzoic acid, which consists in condensing a salt of 2-chloro-5-sulphobenzoic acid with a primary hydroxy-alkylamine in the presence of an acid absorbing agent and of a catalyst.

3. A process for the production of 2-hydroxy-alkylamino-5-sulphobenzoic acid, which consists in condensing a salt of 2-chloro-5-sulphobenzoic acid with a primary hydroxy-alkylamine in the presence of an acid absorbing agent and of copper powder.

4. As new products, the acids of the general formula

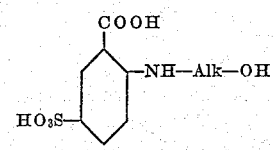

wherein Alk stands for an alkyl radicle.

PIERRE PETITCOLAS.
JOSEPH FRENKIEL.